United States Patent
Lang et al.

(10) Patent No.: US 10,509,207 B2
(45) Date of Patent: Dec. 17, 2019

(54) CAMERA SYSTEM FOR A VEHICLE, MIRROR REPLACEMENT SYSTEM COMPRISING SUCH CAMERA SYSTEM, AND DRIVER ASSISTANCE SYSTEM COMPRISING SUCH SYSTEM

(71) Applicants: Werner Jürgen Lang, Ergersheim (DE); Andreas Enz, Burgbernheim (DE); Andreas Redlingshöfer, Trautskirchen (DE)

(72) Inventors: Werner Jürgen Lang, Ergersheim (DE); Andreas Enz, Burgbernheim (DE); Andreas Redlingshöfer, Trautskirchen (DE)

(73) Assignee: MEKRA LANG GMBH & CO. KG, Ergersheim (DE)

( * ) Notice: Subject to any disclaimer, the term of this patent is extended or adjusted under 35 U.S.C. 154(b) by 0 days.

(21) Appl. No.: 15/957,673

(22) Filed: Apr. 19, 2018

(65) Prior Publication Data
US 2018/0307009 A1    Oct. 25, 2018

(30) Foreign Application Priority Data

Apr. 21, 2017 (DE) .................. 10 2017 108 569

(51) Int. Cl.
*G02B 13/00* (2006.01)
*G02B 13/06* (2006.01)
(Continued)

(52) U.S. Cl.
CPC ............ *G02B 13/0045* (2013.01); *B60R 1/00* (2013.01); *G02B 13/06* (2013.01);
(Continued)

(58) Field of Classification Search
None
See application file for complete search history.

(56) References Cited

U.S. PATENT DOCUMENTS 3,728,011 A     4/1973 Mori
10,136,037 B1 * 11/2018 Keenan ................... H04N 7/18
(Continued)

FOREIGN PATENT DOCUMENTS

DE     1 288 334     1/1969
DE     2 214 096     10/1972
(Continued)

*Primary Examiner* — James M Hannett
(74) *Attorney, Agent, or Firm* — Cozen O'Connor

(57) ABSTRACT

A camera system for a vehicle comprising a capturing unit which comprises an optical element and image sensor with surface, to capture a section of a vehicle environment. The optical element has a distortion curve $r=f(\alpha)$, wherein r is the distance between an object point displayed on the image sensor surface and the intersection point of the optical axis with the image sensor surface, and $\alpha$ is the angle between the optical axis of the optical element and the beam incident on the optical element from the object point. The distortion curve $r=f(\alpha)$ has, for $r_w=f(\alpha_w)$ within $0<r<r_{max}$, a turning point $\alpha_w$; $r_w$, for which $r''=f''(\alpha_w)=d^2r/d\alpha^2(\alpha_w)=0$ applies, wherein $r_{max}$ is the distance $r=f(\alpha_{max})$ on the image sensor surface from the optical axis to the most distant edge of the image sensor.

21 Claims, 9 Drawing Sheets

(51) Int. Cl.
  *B60R 1/00* (2006.01)
  *H04N 5/232* (2006.01)
(52) U.S. Cl.
  CPC .... *H04N 5/23238* (2013.01); *B60R 2300/108* (2013.01); *B60R 2300/30* (2013.01); *B60R 2300/304* (2013.01); *B60R 2300/605* (2013.01); *B60R 2300/8046* (2013.01); *B60R 2300/8066* (2013.01)

(56) References Cited

U.S. PATENT DOCUMENTS

| | | | |
|---|---|---|---|
| 10,317,644 B2* | 6/2019 | Liu | G02B 13/004 |
| 2005/0083405 A1 | 4/2005 | Imoto et al. | |
| 2005/0083427 A1 | 4/2005 | Imoto | |
| 2006/0092277 A1 | 5/2006 | Ito | |
| 2010/0265048 A1* | 10/2010 | Lu | B60Q 9/005 340/435 |
| 2010/0302647 A1 | 12/2010 | Hirose | |
| 2016/0097915 A1* | 4/2016 | Chung | G02B 13/0045 359/714 |

FOREIGN PATENT DOCUMENTS

| | | |
|---|---|---|
| DE | 102004043257 | 4/2005 |
| DE | 102004043236 | 5/2005 |
| DE | 102010032411 | 2/2012 |
| EP | 2881927 | 6/2015 |
| JP | 2003-219226 | 7/2003 |
| JP | 2005-110202 | 4/2005 |
| JP | 2006-343545 | 12/2006 |
| JP | 2009-058648 | 3/2009 |
| JP | 2010-276755 | 12/2010 |
| JP | 47-66841 | 9/2011 |

* cited by examiner

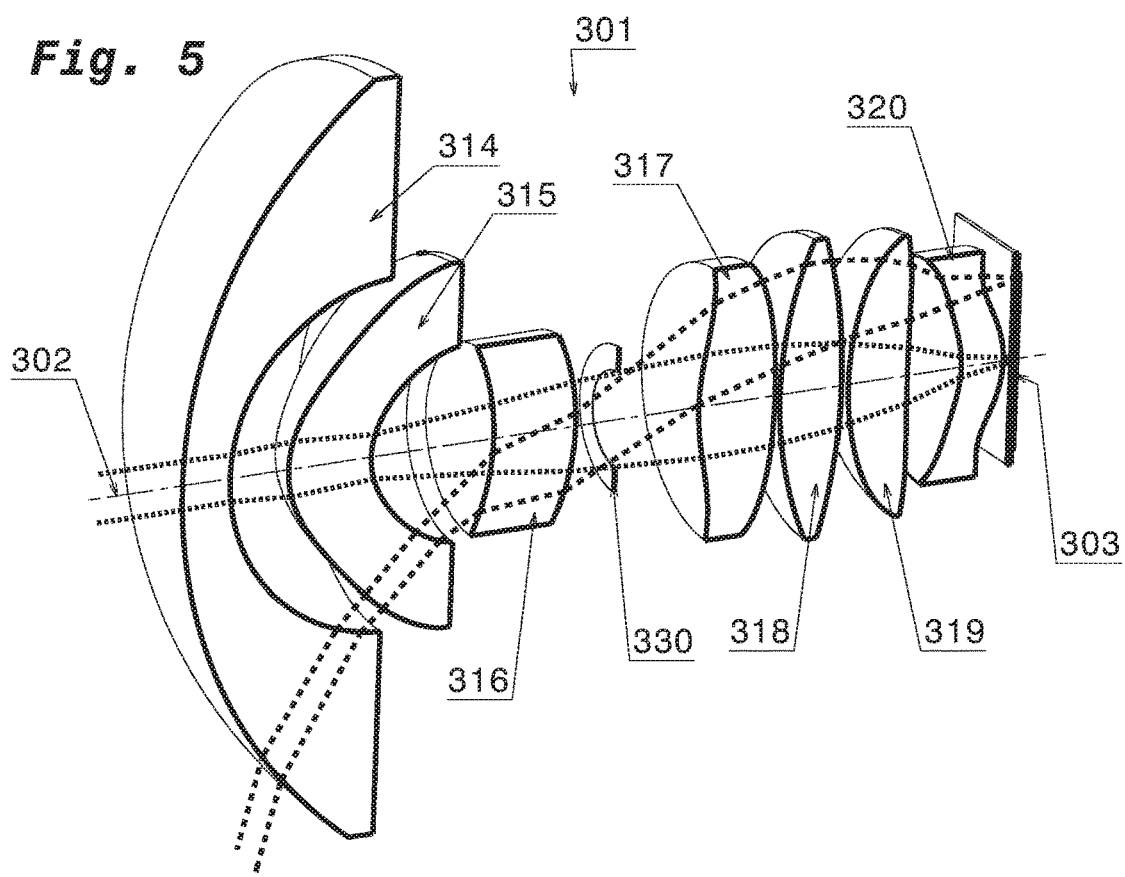
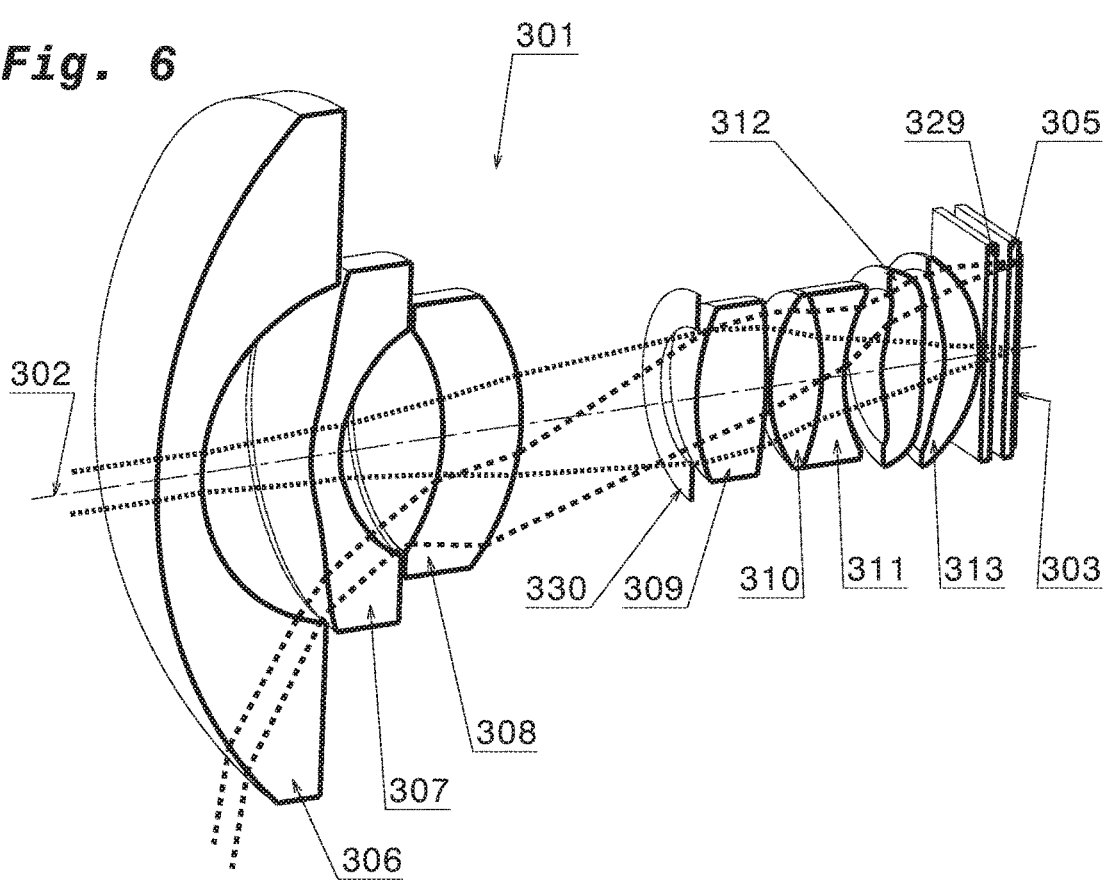

CAMERA SYSTEM FOR A VEHICLE, MIRROR REPLACEMENT SYSTEM COMPRISING SUCH CAMERA SYSTEM, AND DRIVER ASSISTANCE SYSTEM COMPRISING SUCH SYSTEM

BACKGROUND OF THE INVENTION

1. Field of the Invention

The invention relates to a camera system for a vehicle, in particular commercial vehicle. The invention further relates to a mirror replacement system for a motor vehicle comprising such camera system, and a driver assistance system for a vehicle comprising such camera system.

2. Description of the Related Art

Currently, camera systems are increasingly used on or in vehicles, e.g. a camera system used on the vehicle in the context of a supplementary system for conventional mirrors, for example, to provide a parking aid for the driver of a passenger vehicle. Further, camera systems are increasingly used in the context of so-called mirror replacement systems, where mirrors that are prescribed for vehicles, e.g. exterior mirrors (main mirrors), interior mirrors of passenger cars, or wide-angel mirrors and front mirrors of commercial vehicles, are completely replaced. In such mirror replacement systems, the relevant field of vision, which is usually made visible by a mirror, is permanently and in real-time displayed to the vehicle driver on a monitor or another reproduction unit provided, for example, in the vehicle interior, such that the vehicle driver can view the relevant field of vision at any time, although no mirror is provided. Further, camera systems on vehicles are used in the context of so-called advanced driver assistance systems (ADAS), where either also the data captured by the camera system, e.g. dependent on the respective present driving situation, are displayed to the vehicle driver, or where the captured image data is evaluated in order to control other vehicle components, e.g. in the context of distance and/or obstacle detection, road condition detection, lane-keeping assistant, road sign recognition etc.

For use on the vehicle, often, either due to legal prescriptions or due to the object and intended purpose, respectively, of the camera system, specific requirements have to be met by the capturing device (e.g. camera) of the camera system, for example. with regard to resolution, the angular range to be captured by the camera system, requirements with regard to sharpness with respect to image depth and the like. These requirements, for example, allowing extraction of the desired data from the captured image data, are temporarily opposed, so that, for example, at the same time, a wide angular range should/is to be recorded and, simultaneously, in at least one region/part of the captured angular range, a very high resolution and depth of focus have to be achieved. Thus, in a complex on-vehicle camera system, it is usually necessary to provide a plurality of capturing units, even if they are directed towards the same or towards overlapping areas around the vehicle, and to subsequently combine the image data captured by the plurality of capturing units, for example, into a joint image. Alternatively, by using a plurality of capturing units, each capturing unit may be assigned its own function with regard to the different, possibly opposed requirements, and subsequently, the image data captured by the plurality of capturing units may be analysed such that, from each image, e.g. for a driver assistance system, the respectively assigned and allocated information is extracted.

In practice this means that, usually, for example, in a mirror replacement system, the individual fields of vision have to be respectively captured by individual capturing units, i.e. at least one capturing unit per field of vision. For this purpose, the prior art in particular provides camera systems on the vehicle, where a plurality of separate image sensors and optics, i.e. separate capturing units, are provided, the image data of which are subsequently combined by means of stitching. Alternatively, it is also known to provide a common optics having a plurality of image sensors, which are then combined into a larger image sensor surface, thus allowing for capturing a larger image by means of a common optics, but separate (several) image sensors.

SUMMARY OF THE INVENTION

Based thereon, it is an object of the invention to provide a camera system for a vehicle, in which also complex requirements to quality and the range of image data can be implemented as flexible as possible by means of a single capturing unit that comprises a single image sensor with a single image sensor surface and a single optical element. Moreover, it is an object to provide a mirror replacement system as well as a driver assistance system, which is able to implement, with little effort, complex image capturing requirements for the mirror replacement system and the driver assistance system, respectively, by means of a camera system.

In the present specification, a camera system for a vehicle is disclosed comprising: a camera system for a vehicle, comprising a capturing unit including an optical element and an image sensor having an image sensor surface and adapted to capture a section of a vehicle environment, wherein the optical element has a distortion with a distortion curve $r=f(\alpha)$, wherein r is the distance from an object point depicted on the image sensor surface to the intersection point of the optical axis with the image sensor surface, and α is the angle between the optical axis of the optical element and the beam incident in the optical element from the object point, the distortion curve $r=f(\alpha)$ for $rw=f(\alpha w)$ has a turning point $(\alpha w; rw)$ within $0 < r < rmax$, for which $r''=f''(\alpha w)=d2r/d\alpha\ 2(\alpha w)=0$ applies, wherein rmax is the distance $r=f(\alpha max)$ on the image sensor surface from the optical axis to the most distant boundary point of the image sensor surface, and for the curvature of the distortion curve $r''=f''(\alpha)<0$ for $0° < \alpha < \alpha w$ $r''=f'''(\alpha)>0$ for $\alpha w < \alpha < \alpha max$ applies.

The camera system is based on the idea to adapt the optical element of the capturing unit (e.g. camera) such that, on a single image sensor, both an area requiring high resolution can be displayed and a relatively huge angle (wide angle) can be captured by means of the capturing unit, and both can be displayed on an image sensor in a joint manner. An image sensor has to be understood as a substantially plane recording surface, wherein that surface of the image sensor where the image captured by the optical element is actually depicted, is referred to as image sensor surface. The image sensor surface as well as the image sensor are, for example, rectangular, i.e. the image sensor surface is a rectangular surface having an edge with edge points at respectively two edges of the rectangle, which are parallel to each other. Also the image sensor is usually rectangular and substantially corresponds to the shape of the image sensor surface.

The optical element comprises, for example, an arrangement of a plurality of lenses, which are arranged one after the other and, if necessary, further optical components, and serves for directing an incident light beam to the image sensor and the image sensor surface, respectively, to bundle the beam etc. The characteristics of the optical element, in particular its distortion, are determined by the selection of the lenses and optical components. The optical element has an optical axis, which, in case of a rotationally symmetric system, is the axis of rotational symmetry of the system. Both in a rotationally symmetric system and in a system which is not rotationally symmetric with regard to the optical axis, it is ensured along the optical axis in any case that the effected imaging and the path of the incident light beam through the optical element, respectively, are distortion-free, while, with increasing distance from the optical axis, a distortion results, which is a geometrical aberration causing a local change of the image scale. Often, the change of scale is a change in enlargement with increasing distance of the image point from the optical axis and, in a rotationally symmetric system, rotationally symmetric around one point, the so-called distortion center, which corresponds to the intersection point of the optical axis and the image sensor surface. Depending on the optical system, the distortion may differ; in a pillow-shaped distortion, for example, enlargement increases towards the edges of the image field, and in a barrel distortion, it decreases towards the edges.

Furthermore, the optical axis is the axis along which an incident light beam usually passes through the optical element in an undeflected manner, and impinges on the image sensor surface.

Thus, the camera system for a motor vehicle is based on the idea to actively configure the distortion of the optical element by use and selection of specific lens arrangements forming the optical element, so that requirements as, for example a wide angle image, i.e. an image having a huge image angle, and an image that is substantially distortion-free or has only little distortion, with high resolution for the desired/requested image portions, can be achieved at the same time. For this purpose, the optical element has a distortion with a distortion curve $r=f(\alpha)$, wherein r is the distance from an object point displayed on the image sensor surface to the intersection point of the optical axis with the image sensor surface, and $\alpha$ is the angle between the optical axis of the optical element and the beam incident into the optical element from the object point. The distortion curve $r=f(\alpha)$ has a turning point $(\alpha_w; r_w)$, preferably exactly one turning point $(\alpha_w; r_w)$ within $0<r(\alpha)<r_{max}$, wherein $r_{max}$ is the distance $r=f(\alpha_{max})$ on the image sensor surface from the optical axis to the edge point of the image sensor surface that is located furthest therefrom. Here, the object point is a point from which an incident light beam emanates, which is displayed on the image sensor surface by means of the incident light beam passing through the optical element. The angle $\alpha$ between the optical axis of the optical element and the beam incident into the optical element from the object point corresponds to the minimum objective aperture angle required for the respective object point and, in the following, is referred to as object angle $\alpha$. In other words, the object angle $\alpha$ is the angle included between the optical axis and the light beam incident into the optical system from the object point, as long as the same is outside the optical system or optical element. Hence, the angle $(90°-\alpha)$ is the angle between the incident beam at the point where the light beam enters the optical element, and a plane that passes through this point and is perpendicular to the optical axis.

Thus, the object angle $\alpha$ refers to an angle enclosed by a light beam incident into the optical element from an object point outside the optical element, and the optical axis. After passing through the optical element, this object point is correspondingly depicted/displayed on the image sensor surface.

The distortion curve $r=f(\alpha)$ of the optical element thus has a turning point within the image sensor surface, for which the second derivative of the distortion curve $r=f(\alpha)$, i.e. $r''=f''(\alpha)=0$, applies. Simultaneously, in an $\alpha$, r coordinate system, in the region between the origin of the distortion curve and the edge point of the image sensor surface that is farthest from the origin on the image sensor surface, the distortion curve has a left-curved portion on one side of the turning point and a right-curved portion on the other side of the turning point, wherein a right curved portion ($r''=f''(\alpha)<0$) is present in the region of $0°<\alpha<\alpha_w$, and a left-curved portion ($r''=f''(\alpha)>0$) is present in the region of $\alpha_w<\alpha<\alpha_{max}$, wherein $\alpha_{max}$ is defined by the limitation of the image sensor surface. $\alpha_{max}$ is the angle $\alpha$ that corresponds to the maximum distance $r_{max}$ from the optical axis to the furthest edge point of the image sensor surface. For example, if the optical axis is located centrally on the image sensor surface, i.e. at the centroid of a substantially rectangular image sensor, then $r_{max}$ corresponds to the distance from the optical axis on the image sensor surface to an (arbitrary) edge point of the rectangle. If the optical axis is located eccentrically, i.e. not at the centroid of the image sensor surface, then $r_{max}$ is defined by the distance from the optical axis to the edge of the rectangle that is furthest from the optical axis, in case of a substantially rectangular image sensor. The origin of the $\alpha$, r coordinate system corresponds to the optical axis on the image sensor surface.

By using the described distortion curve $r=f(\alpha)$ as described, a specific or defined, relatively large, distortion-free or substantially distortion-free displayed portion with high resolution can thus be achieved near the intersection point of the optical axis with the image sensor and the optical axis on the image sensor, respectively, while, simultaneously, a large angle portion can be captured where, for larger $\alpha$, i.e. for object points positioned farther from the optical axis, a relatively high resolution can be achieved, which is, for example, still sufficient for displaying, for example, legally prescribed fields of vision. Here, it is not necessary to use a capturing unit that has extremely high resolution and, consequently, involves large datasets. As a result, no, or only little, post-processing of the image data is required for distortion correction, which could not influence, in particular increase, the present/existing resolution anyway.

In particular the distortion curve having the shape of an S-curve enables a single image sensor with relatively low resolution to, nevertheless, provide an image representation which, with respect to sharpness, resolution and similar requirements, as well as to the image region, allows for capturing two fields of vision around a commercial vehicle by means of a single capturing unit, and for displaying the same in the context of a mirror replacement system on a monitor or a display unit, even if one of the fields of vision is the field of vision of a wide angle mirror. Due to the fact that an image sensor and a capturing unit, respectively, with relatively low resolution can be used, it is possible to design the system in a cost-effective and simplified manner as, in a processing unit, which processes the data of the capturing unit, a reduced data volume has to be processed and, thus, the components processing the data volume like, for example, the calculation unit or the working memory of the capturing unit, can be designed smaller and, thus, more cost-effective. Moreover, in case of similar designs of the processing units, the processing speed is larger and the system load is lower, respectively, such that, on the one hand, quick data processing can be performed and, on the other hand, the processing unit, in particular the underlying electronic system, warms up less and, thus, allows for a simplified heat management.

Besides the fact that a single common/joint capturing unit can, for example, capture the data of two fields of vision, it is not necessary to combine data of separate capturing units, at least not to the extent in which the one, common capturing unit captures the desired sub areas of the vehicle environment. Moreover, it is easier to integrate and arrange the reduced number of required capturing units on the vehicle.

At the same time, by means of the distortion curve, a very high resolution can be achieved where it is required or demanded, i.e. in the highly relevant region in the vehicle environment, which is within the captured sub-area of the vehicle environment. Finally, it is possible to utilise the entire image sensor surface such that sufficiently high resolutions can be achieved over the entire image sensor surface, so that a portion of the image sensor read by a data processing unit may be displaced/shifted, i.e. changed, on the image sensor, if required. Such displacement (panning) of the read-out portion may be carried out, for example, depending on the driving situation, or if the vehicle driver wishes to manually adjust the region captured by the capturing unit, which region may be displayed on a display unit on the vehicle. This means that it is not necessary to provide a mechanical adjustment of the capturing unit for adjusting the viewed area/region. This may rather be effected by "shifting" the data of the read-out portion on the image sensor surface, so that the camera system is more cost-effective and robust, with reduced failure probability.

In a rotationally symmetric optical element, the distortion curve $r=f(\alpha)$ is also rotationally symmetric, i.e. identical for all angles $\beta$ about the optical axis on the image sensor, which optical axis is displayed as a point. In a not rotationally symmetric optical element, it is possible to provide, for different partial angular ranges about the optical axis displayed on the image sensor, different distortion curves $r=f(\alpha)$, i.e. $r_{\beta 1}=f_{\beta 1}(\alpha)$, $r_{\beta 2}=f_{\beta 2}(\alpha)$ ... $r_{\beta n}=f_{\beta n}(\alpha)$, which apply for particular partial angular ranges about the optical axis on the image sensor. Basically, the partial angular ranges to which a common distortion curve applies can be arbitrarily large, as long as arrangements of lenses and other optical components with regard to the optical element allow for it.

Preferably, the distortion curve $r=f(\alpha)$ of the camera system has exactly one turning point $(\alpha_w; r_w)$ within $0<r(\alpha)<r_{max}$. This allows for optimally using the available image sensor surface with regard to the requirements on on-vehicle camera systems, in particular regarding resolution and precision on the one hand, and angular range of the angle captured by the camera system on the other hand.

According to a particularly preferred embodiment, the gradient $r'=dr/d\alpha$ of distortion curve $r=f(\alpha)$ in the region of $0<\alpha<\alpha_w$ is maximal in the origin or zero point ($r=f(0)=0$) of the distortion curve. This means that in the immediate proximity of the optical axis on the image sensor surface, the gradient of the distortion curve $r=f(\alpha)$ is maximal, and subsequently decreases toward the turning point. The maximum of the distortion curve in the zero point does not have to be absolute; however, this is not excluded. Usually, it is sufficient if, in the displayed portion of the distortion curve $r=f(\alpha)$, the distortion curve has a maximum with regard to the region $0°<\alpha<\alpha_w$ at the zero point. This allows for displaying a relatively large area around the optical axis or, starting from the optical axis within this region, it can be displayed with a maximal or relatively large gradient of the distortion curve, in particular with regard to or compared to conventional distortion curves as, for example, an equidistant distortion curve. In this case, the distance r for identical angles $\alpha$ is smaller on the image sensor surface than in case of the distortion curve, which has a largest possible gradient in the region of the zero point or immediately at the zero point $\alpha=0$, $r=0$.

According to another particularly preferred embodiment, the gradient $r'=dr/d\alpha$ for the distortion curve $r=f(\alpha)$ is minimal at the turning point $(\alpha_w; r_w)$. Similar to a largest possible gradient at the zero point of the distortion curve, here, too, the minimum is to be understood as a relative minimum for the displayed portion of the distortion curve on the image sensor and not necessarily as an absolute minimum over the entire (virtual) distortion curve (which is possibly located beyond the image sensor). It is sufficient if the minimum is a minimum in the displayed portion and in the area of the image sensor surface, respectively, i.e. a minimum in the region of $0°<\alpha<\alpha_{max}$.

It is also preferable that the gradient $r'=dr/d\alpha$ of the distortion curve $r=f(\alpha)$ is in the range of $0°<\alpha<\alpha_{max}$ for $\alpha_{max}$, i.e. maximal at the maximal radius $r_{max}$. Also this maximum does not have to be an absolute maximum of the distortion curve. It is sufficient if, at this position, the maximum of the distortion curve for the region $\alpha_w<\alpha<\alpha_{max}$ is located.

According to a preferred embodiment, the distortion curve having the above characteristics can be realised by a polynomial function $f(\alpha)=\Sigma^n_{i=0} a_i \alpha^i$. Alternatively, the distortion curve $r=f(\alpha)$ can also be provided by an $n^{th}$ order spline, i.e. a traverse. That is, it may also be provided as a function which is, step by step, composed of polynomes of maximum $n^{th}$ order. In this case, the polynome is, therefore, not provided by a single polynome, but by a plurality of polynomes which are composed step by step. A further possibility is to provide a Bézier curve, which is a parametrically modelled curve and, therefore, also can fulfil the requirement of (exactly) one turning point within the region of $0<r<r_{max}$. These mathematical functions allow for a relatively simple modelling of the optical element and the distortion curve of the optical element, respectively.

In a particularly preferred embodiment, the centroid of the usually rectangular image sensor surface and the intersection point of the optical axis with the image sensor surface and the image of the optical axis on the image sensor surface, respectively, are displaced to each other. In particular the optical axis is arranged eccentrically with regard to the image sensor surface, i.e. not arranged at the centroid. This allows for defining and modelling desired regions with regard to the distortion on the image sensor surface in a more specific and improved manner, and, if necessary, to cut them out or extract them by means of a processing unit in order to display them on a display unit visible for the vehicle driver, for example, or in order to evaluate them with regard to specific data. Thus, the region of interest may be selected over nearly the entire surface of the image sensor or over the entire image sensor surface, and may be cut out or read out and further processed by the data processing unit.

Preferably, the optical element is realised by a plurality of lenses arranged in a row and, if necessary, supplemented by further optical components as, for example, filters. The optical element, for example, comprises at least one lens having a surface other than a partially spherical surface, at least one aspherical lens and/or at least one lens having a freeform surface. It is particularly preferred to combine at least two lenses that are different with regard to their characteristics and shapes, as this allows for providing an optical element having (exactly) one turning point $(\alpha_w; r_w)$ in its distortion curve $r=f(\alpha)$. If a number of rotationally symmetric lenses having different surfaces are arrange in a row one behind the other, this results in a distortion curve $r=f(\alpha)$, which is identical for each angle of rotation $\beta$ around the optical axis. In this case, the optical element as a whole is, therefore, rotationally symmetric with regard to its optical axis. This is particularly advantageous if the capturing unit also has a substantially rotationally symmetric requirement, e.g. with regard to resolution.

Alternatively, it is also possible to provide an optical element having a distortion that is not rotationally symmetric with regard to its optical axis, so that a first distortion curve $r_{\beta 1}=f(\alpha)$ for an angle of rotation $\alpha_1$ around the optical axis differs from a second distortion curve $r_{\beta 2}=f(\alpha)$ for an angle of rotation $\alpha_2$ around the optical axis. Preferably, however, the distortion curves are at least partially, i.e. for certain angular ranges around the optical axis, identical or very similar, such that the respective requirements regarding resolution, angular range and the like of certain regions of the captured image can be met. Basically, an arbitrary number of distortion curves $r_{\alpha n}$ may be provided. For a not rotationally symmetric distortion, however, it is sufficient if at least sections with a first distortion curve $r_{\alpha 1}=f(\alpha)$ and a second distortion curve $r_{\alpha 2}=f(\alpha)$, respectively, are provided. In case that a not rotationally symmetric distortion is intended, it is desirable that the optical element is anamorphic, i.e. not rotationally symmetric per se, so that, dependent on the rotational angle around the optical axis, different distortion curves are present. It is, for example, possible that one or a plurality of the lenses forming the optical element is/are anamorphic. Alternatively, for example, an arrangement of individual lenses or optical components of the optical element, which arrangement is at least partially eccentric with regard to the optical axis of the optical element, could be chosen.

Further, the camera system preferably comprises at least one processing unit for processing the data of the capturing unit and/or a display unit for displaying information captured by means of the capturing unit visible for the vehicle driver. The processing unit for processing the data may, for example, be provided in the context of a general on-board computer (ECU) of the vehicle, or it may be a separate unit provided specifically for the camera system, or it may be integrated in the camera system itself. The display unit is formed, for example, as a monitor, as a plurality of monitors, as a projection on other vehicle components etc. Besides a visual display unit, the display unit may, additionally or supplementary, also be implemented as audio reproduction unit. Moreover, it may be a display unit which, for example, in the context of a driver assistance system, warns the driver only in certain driving situations, which again may be effected by means of a visual display, an acoustic signal, or a haptic signal like, for example, vibration of the steering wheel, if an evaluation by the processing unit of the image data captured by the camera system transmits a corresponding signal to the display unit.

A particularly preferred use of the camera system is the use in the context of a mirror replacement system. Mirror replacement systems for vehicles have been increasingly used, thereby replacing conventional mirrors on or in the vehicle. The type of mirrors which are prescribed for a vehicle and can therefore be replaced in the context of a mirror replacement system is usually defined by legal provisions, in Europe, for example, by Regulation No. 46 of the United Nations Economic Commission for Europe (UN/ECE) (Addendum 45, Revision 6 currently available). A different subject are so-called additional visual systems, which are not prescribed visual supports that allow for overseeing an area that is not required to be permanently and continuously visible for the driver according to a legal provision. An example for this type of additional visual system is, e.g. in the context of a parking assistance, a reversing camera on a vehicle.

In many countries around the world, an interior mirror provided within the vehicle (according to ECE-R46 "interior mirror group I") and a (small) main mirror (according to ECE-R46 "main mirror (small) group III") on a driver's side, and often also on the passenger's side, are prescribed for passenger cars. For commercial vehicles, an interior mirror is usually not prescribed, as unobstructed view through the rear of the vehicle is usually not possible through the driver's cabin. Rather, usually a main mirror (large) (according to ECE-R46 "main mirror (large) group II") and a wide angle mirror (according to ECE-R46 "wide angle mirror group IV") are prescribed besides other mirrors. Main mirrors are those mirrors that are attached to the outside of the vehicle and can be viewed by the driver as exterior mirrors. Depending on the country regulations, further mirrors like, for example, a near range/approach mirror (according to ECE-R46 "near range/approach mirror group V") and/or a front mirror (according to ECE-R46 "front mirror group VI") may be prescribed for commercial vehicles.

The regions around the vehicle, which have to be viewed by means of the different mirrors, and thus also have to be viewed by means of a camera monitoring system, are defined/prescribed in the corresponding legal requirements of individual countries and territories/regions, respectively. Usually, a so-called field of vision is defined, which designates a plane and horizontal part of the road around the vehicle, and which has to be visible permanently, at any time, and in real time for the vehicle driver.

The field of vision of the interior mirror of a passenger car, for example is defined such in ECE-R46 that the vehicle driver can view a plane and horizontal part of the road, which is located centrically with regard to the longitudinal central plane of the vehicle, has a width of 20 m, and extends from the horizon up to 60 m behind the eye points of the vehicle driver. A field of vision for a main exterior mirror for passenger cars is defined such with regard to the driver's side of the vehicle, that the vehicle driver can view at least a plane and horizontal part of the road, having a width of 5 m, which is limited on the vehicle side by a plane that is in parallel to the longitudinal central plane of the vehicle and extends through the most exterior point on the driver's side of the vehicle, and which extends from the horizon up to 30 m behind the eye points of the vehicle driver. The field of vision of the main exterior mirror further includes a strip of the road having a width of 1 m, which is limited on the vehicle side by a plane that is parallel to the vertical central longitudinal plane of the vehicle and passes through the most exterior point on the driver's side of the vehicle, and which begins 4 m behind the vertical plane passing through the eye points of the vehicle driver. A field of vision of an exterior mirror on the passenger's side is analogously defined on the passenger's side of the vehicle.

A field of vision of a main mirror (main exterior mirror) on the driver's side (the same applies for the passenger's side) of a commercial vehicle is, for example, defined such in ECE-R46 that the vehicle driver can view at least a plane and horizontal part of the road, having a width of 4 m, which is limited on the vehicle side by a plane that is in parallel to a vertical central longitudinal plane of the vehicle and passes through the most exterior point on the driver's side of the vehicle, and which extends from the horizon up to 20 m behind the eye point of the vehicle driver. This field of vision further includes a strip of the road having a width of 1 m, which is limited on the vehicle side by a plane that is in parallel to the vertical central longitudinal plane of the vehicle and passes through the most exterior point on the driver's side of the vehicle, and which begins 4 m behind the vertical plane passing through the eye points of the driver. A field of vision of a wide angle mirror, which is usually only provided in a commercial vehicle and not in a passenger car, is defined such that the vehicle driver can view at least a plane and horizontal part of the road, which has a width of 15 m and is limited on the vehicle side by a plane that is in parallel to the vertical central longitudinal plane of the vehicle and passes through the most exterior point on the driver's side of the vehicle, and which extends at least 10 m to 25 m behind the eye points of the driver. The field of vision of the wide angle mirror further includes a strip of the road, which has a with of 4.5 m and is limited on the vehicle side by a plane in parallel to the vertical central longitudinal plane of the vehicle and passes through the most exterior point on the driver's side of the vehicle, and which begins 1.5 m behind the vertical plane passing through the eye points of the driver.

According to ECE-R46, the field of vision of a near range or approach mirror is, for example, provided such that the vehicle driver can view at least a plane and horizontal part of the road on the outside of the vehicle, which is limited by: a plane in parallel to the vertical central longitudinal plane of the vehicle and passing through the most exterior point on the passenger's side of the vehicle; a plane extending in parallel thereto and spaced 2 m apart from this plane; a plane extending in parallel to and 1.75 m behind the plane passing through the eye points of the vehicle driver; a vertical plane extending 1 m in front of and in parallel to the plane passing through the eye points of the vehicle driver, or a plane which passes through the outmost point of the bumper of the vehicle if this plane extends closer than 1 m in front of the vertical plane extending in parallel through the eye points of the vehicle driver. In vehicles where the field of vision of a near range or approach mirror is captured by a mirror that is attached more than 2.4 m from the ground, or captured by a corresponding capturing device, the described field of vision is extended such that the driver can view a flat horizontal part of the road along the side of the vehicle and outside the above-defined field of vision of a near range or approach mirror, which may be rounded at the front with a radius of 2 m, and is limited by the following lines: in the transverse direction by the plane, which extends in a distance of 4.5 m in front of the vehicle side plane; to the rear by the plane in parallel to a vertical plane extending through the eye points of the vehicle driver and arranged 1.75 m behind this plane; to the front by the plane in parallel to the vertical plane extending through the eye points of the driver and arranged 3 m in front of this plane.

According to ECE-R46, the field of vision of a front mirror must be provided such that the vehicle driver can view/overlook a plane and horizontal part of the road, which is limited by the following planes: a perpendicular transverse plane, which passes through the foremost point at the vehicle front, a perpendicular transverse plane extending 2 m in front of this plane; a plane in parallel to the vertical central longitudinal plane of the vehicle, which passes through the outmost point on the driver's side of the vehicle, and a plane in parallel to the vertical central longitudinal plane of the vehicle, which extends at a distance of 2 m from the outmost point on the passenger's side of the vehicle.

In the description, if reference is made to fields of vision of a main mirror, a wide angle mirror, an interior mirror, a near range mirror, a front mirror etc., the corresponding fields of vision as respectively defined in the national available regulations, which correspond to the described fields of vision of the mirrors, are meant. If no corresponding national regulations or definitions are available for fields of vision, the dimensions as described have to be considered as a definition for the respective field of vision.

Preferably, the mirror replacement system, which, besides a processing unit for the data captured by the camera system, preferably comprises a display unit for visibly displaying the information captured by means of the capturing unit for the driver, is designed such that the display unit displays the data visible for the vehicle driver. This may be effected, for example, by means of monitors located inside or outside of the vehicle, or by means of a projection on vehicle components.

Preferably, the mirror replacement system is adapted to display on the display unit at least one field of vision visible for the vehicle driver. Specifically, this field of vision may be one of the above-described fields of vision.

According to another preferred embodiment, the mirror replacement system is adapted to capture the field of vision of a main mirror and the field of vision of a wide angle mirror on the same vehicle side by the common/joint capturing system of the camera system having a common/joint image sensor, i.e. a single image sensor, and to display the same on the display unit visible for the driver. In particular due to the characteristic distortion curve of the optical element of the capturing unit, which is a common/joint, single capturing unit for the field of vision of the main mirror and the field of vision of the wide angle mirror, it is possible to provide both the relatively large angle to be displayed, which is required for a field of vision of a wide angle mirror of a commercial vehicle, and an adequate resolution, in particular with regard to the field of vision of the main mirror and also with regard to the depth, i.e. the extension of the field of vision of the main mirror to the rear along the commercial vehicle.

The same applies if, instead of the field of vision of the main mirror and the field of vision of the wide angle mirror, the field of vision of a near range/approach mirror and the field of vision of a front mirror are captured at the same time by the common/joint camera system and, in particular, by the single capturing unit.

According to a preferred embodiment, if at least two fields of vision around the vehicle are displayed visible for the driver and captured by means of the same capturing unit, i.e. the same optical element and the same image sensor, a first field of vision is visibly displayed in a first region of the display unit, and a second field of vision is visibly displayed in a second region of the display unit, which is optically separated from the first region. This optical separation may be effected by, for example, displaying the first and second fields of vision, respectively, in two separate regions of a common monitor, i.e. a common display unit, by means of the split screen method. If, for example, the fields of vision of a main mirror and a wide angle mirror are captured, the field of vision of a main mirror may be displayed in a first region, and the field of a wide angle mirror may be displayed in a second region located below or above the first portion, wherein preferably a fixed separation, e.g. in the form of a bar, or a superimposed optical separation, e.g. a line, are provided. That is, out of the captured image data, the processing unit extracts the data to be displayed in the first region and the data to be displayed in the second region. Thus, it is clearly recognizable for the vehicle driver, where the respective field of vision is displayed. The display of the fields of vision in a first and second portion on the display unit is preferably not changed during operation of the vehicle with respect to the question where a respective field of vision is displayed.

It is preferable that the processing unit is adapted to separate the data or to extract the data received from the capturing unit, into those to be displayed in the first portion of the display unit and the data to be displayed in the second portion of the display unit. Of course, further image processing can be effected by means of the processing unit such that, for example, additional information is superimposed, it is pointed to dangers or, in the context of the entire field of view being visibly displayed at all times, the same is enlarged or decreased in the respective region, e.g. dependent on driving direction and/or speed.

Here, it is possible that the data for the first region and the data for the second region are extracted from overlapping areas on the image sensor, i.e. the area on the image sensor from which the information for the first region is extracted, and the area on the image sensor from which the information for the second region is extracted overlap, e.g. in the horizontal direction. After extracting the information from the image sensor, the extracted regions may be digitally enlarged, if necessary with different scaling factors.

Instead of displaying two separate regions on the display unit, two fields of vision may also be displayed in a single, seamlessly adjacent image on the display unit (panoramic view). This is possible as the data to be displayed are captured by means of a common image sensor and, thus, the same optics is used for capturing the two fields of vision, such that it is not necessary to combine two different optics having different distortion into a seamless image, which is only possible with considerable additional adjustment and calculation effort. Nevertheless the two regions, at least in the direction that is perpendicular to their (virtual) interface, can be enlarged or diminished by different scaling factors, i.e., for example, by the same scaling factor in vertical direction, but a different scaling factor in horizontal direction.

Preferably, the processing unit is adapted to adjust, dependent on information captured by a sensor and transmitted by the processing unit like, for example, the driving direction of the vehicle, the information for the first and/or second region, which is extracted from the data captured by the capturing unit, with respect to their position in the image captured by the capturing unit on the image sensor. If, for example the fields of vision of a wide angle mirror and a main mirror of a commercial vehicle are captured by means of the capturing unit, for example, a driving direction sensor, i.e. a sensor capturing the steering angle, can provide data that promts the processing unit to adjust the region from which the information displayed to the driver on the display unit is extracted. While driving straight ahead, for example, the information to be displayed may be provided in a first region of the image sensor surface for the field of vision of the main mirror, while, when driving along a curve, i.e. when turning, this information may be provided in a second portion of the image sensor surface. The desired visible area is therefore adjusted/updated without actually adjusting the capturing unit. The distortion curve with the turning point in the region of the image sensor surface allows for ensuring a best-possible and adequate sharpness of the image, even in case the extracted region is shifted on the image sensor. Specifically, the read-out portion of the image sensor surface is shifted such (so-called panning) that it allows the driver to better view the fields of vision, and, due to the distortion curve of the capturing unit, it may also be sifted such that it may be used without substantial distortion correction or image processing. A mechanical adjustment of the capturing unit is therefore no longer required.

This may also be used if the vehicle driver wants to manually adjust the virtual mirror implemented by the camera monitor system analogously to a mirror.

Depending on the requirements, a single vehicle sensor may be used as the sensor, or a combination of at least two vehicle sensors may be used, e.g. functionally identical sensors on different sides of the vehicle (e.g. wheel sensors), or different sensors.

Also a sensor different from a sensor indicating the driving direction of the vehicle can cause/trigger the displacement of the extracted information region on the image sensor surface.

According to a preferred embodiment, in a mirror replacement system, the arrangement of the optical axis of the capturing unit, in particular of the optical element of the capturing unit is oriented such that it intersects the field of vision or one of the fields of vision. Preferably, if the captured and displayed fields of vision are the fields of vision of a main mirror and a wide angle mirror, the optical axis intersects the field of vison in a plane horizontal part of the road at an intersection having a distance of maximally 5 m to a lateral boundary line of the vehicle, wherein the lateral boundary line is an intersection line of a plane in parallel to the central longitudinal plane of the vehicle, which passes through the outmost or lateral outmost point of the vehicle. Therefore, it is possible that a straight line-of-sight segment, which passes through this crossing point, and which is limited by the limitation of the field of vision of the main mirror, is located in the region of the distortion curve which is curved to the right, i.e. in the region for which the second derivative of the distortion curve is smaller than 0 ($r''=f''(\alpha)<0$). Here, the turning point of the distortion curve is preferably located beyond this straight line-of-sight segment. In comparison to conventional distortion curves, it is therefore possible that this region covers a relatively large area on the image sensor for an angle a of the incident light beam and, thus, can be displayed with high resolution.

According to a preferred embodiment, the mirror replacement system is adapted to capture part of the vehicle by means of the capturing unit and to display the same on the display unit visible for the vehicle driver. This allows the driver to easily orient himself and, moreover, in particular in commercial vehicles, to have a good overview over the spatial situation of the commercial vehicle and possible obstacles.

Alternatively or in addition to a mirror replacement system, the camera system can be used for an advanced driver assistance system (ADAS). Here, it is possible to evaluate the captured information, for example with regard to other vehicle environment information, e.g. the presence of road lines, traffic signs, other road users and the like, and, for example, to supply this information to an adaptive cruise control system (ACC, ADR, STA), an emergency brake assistant (ABA), an active lane keep assistant (LKA, LKAS), a lane change assistant or the like, which are part of or constitute the driver assistance system (ADAS), and to provide corresponding outputs to other vehicle components by means of a control unit.

In a particularly preferred embodiment, the camera is directed to the front when seen in a forward driving direction of the vehicle. This is of particular advantage for an automatic distance control or the like. Additionally, the information captured by a driver assistance system can be output and/or displayed to a driver, either in the context of a mirror replacement system or in the context of another assistance system. It is, for example, possible to output corresponding warning signals by means of audio signals, haptic signals or the like, for example vibration of a steering wheel, to the driver and to warn the driver, for example against a dangerous situation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, the invention is exemplarily described by means of the accompanying drawings, in which:

FIG. 5 illustrates a schematic, perspective sectional view of an embodiment of a structure of the optical element of the capturing unit of the camera system;

FIG. 6 is a further sectional perspective view of the detailed structure of the optical element of the capturing unit of the camera system;

DETAILED DESCRIPTION OF THE PRESENTLY PREFERRED EMBODIMENTS

Figure 1:
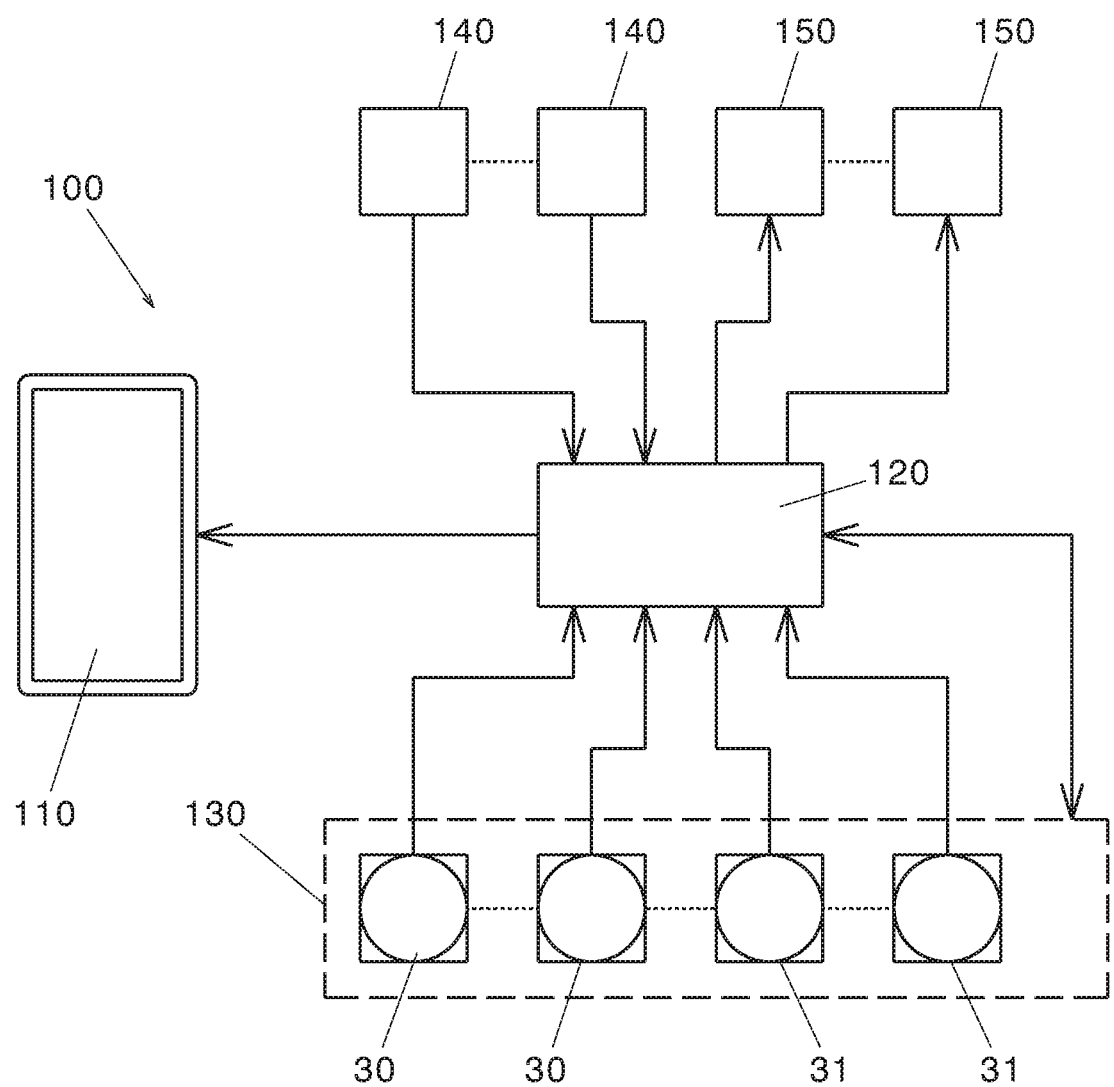
FIG. 1 is a schematic view of a mirror replacement system using a camera system according to the invention.

FIG. 1 shows a schematic view of a mirror replacement system 100, for example, for a commercial vehicle. The mirror replacement system 100 can be integrated in a driver assistance system, or may be used as separate mirror replacement system 100. The mirror replacement system 100 comprises a camera system 130, a processing unit 120, and a display unit 110. Image data captured by the camera system 130 are supplied to the processing unit 120 which, after adequate processing, supplies these image data to a display unit 110 for displaying the same visible for a vehicle driver. The mirror replacement system 100 may further be coupled with one or more vehicle sensors 140, which also supply data to the processing unit 120, like, for example, the current driving state (steering angle, driving speed, driving direction) of the vehicle, which data is taken into account by the processing unit 120 when processing the data received from the camera system 130. Alternatively, the vehicle sensor(s) 140 could be directly coupled with the camera system 130, so that the camera system is directly controlled dependent on the data received by the vehicle sensor(s) 140. It is, therefore, also possible that the processing unit 120 outputs data for controlling the camera system 130 to the camera system 130.

The processing unit 120 may be provided as a processing unit separate from the camera system 130, e.g. in the form of an on-board computer of the vehicle, or, alternatively, it may be integrated into the camera system 130. The display unit 110 is, for example, a monitor provided in the vehicle, where the data supplied from the processing unit 120 are displayed visible for the vehicle driver. Alternatively, instead of a monitor provided in the vehicle, a display unit attached outside the vehicle, e.g. in the region of conventional vehicle mirrors, could be provided. Furthermore, the display unit could be implemented in form of a projection on a vehicle structure component in the vehicle interior. With regard to the display unit 110 it has to be noted that, besides the illustrated embodiment where a monitor is provided for displaying the data supplied by the processing unit 120, also a plurality of separate monitors or display units may constitute the display unit. Depending on the requirements, these monitors may be formed identically to or differently from each other.

Moreover, in particular if used in the context of a driver assistance system (ADAS), the mirror replacement system 100, and in particular its processing unit 120, is connected with further information or control components of the vehicle 150 if required, which components may be display units for the driver, e.g. audio message units, or components that directly control the vehicle, e.g. steering assistance.

The camera system 130 comprises at least one capturing unit 30, which will be described in more detail in the following; it may, however, also comprise a plurality of capturing units 30 of the above-described type. Moreover, further capturing units 31 may be provided, which do not necessarily have to meet the requirements imposed on the capturing units 30. It is therefore possible that the processing unit 120, as indicated in FIG. 1, directly receives image data from the individual capturing units 30 and 31, respectively, instead of receiving said image data from the general camera system 130. Accordingly, the processing unit 120 can also supply control signals directly to the individual capturing units 30, 31.

Figure 2:
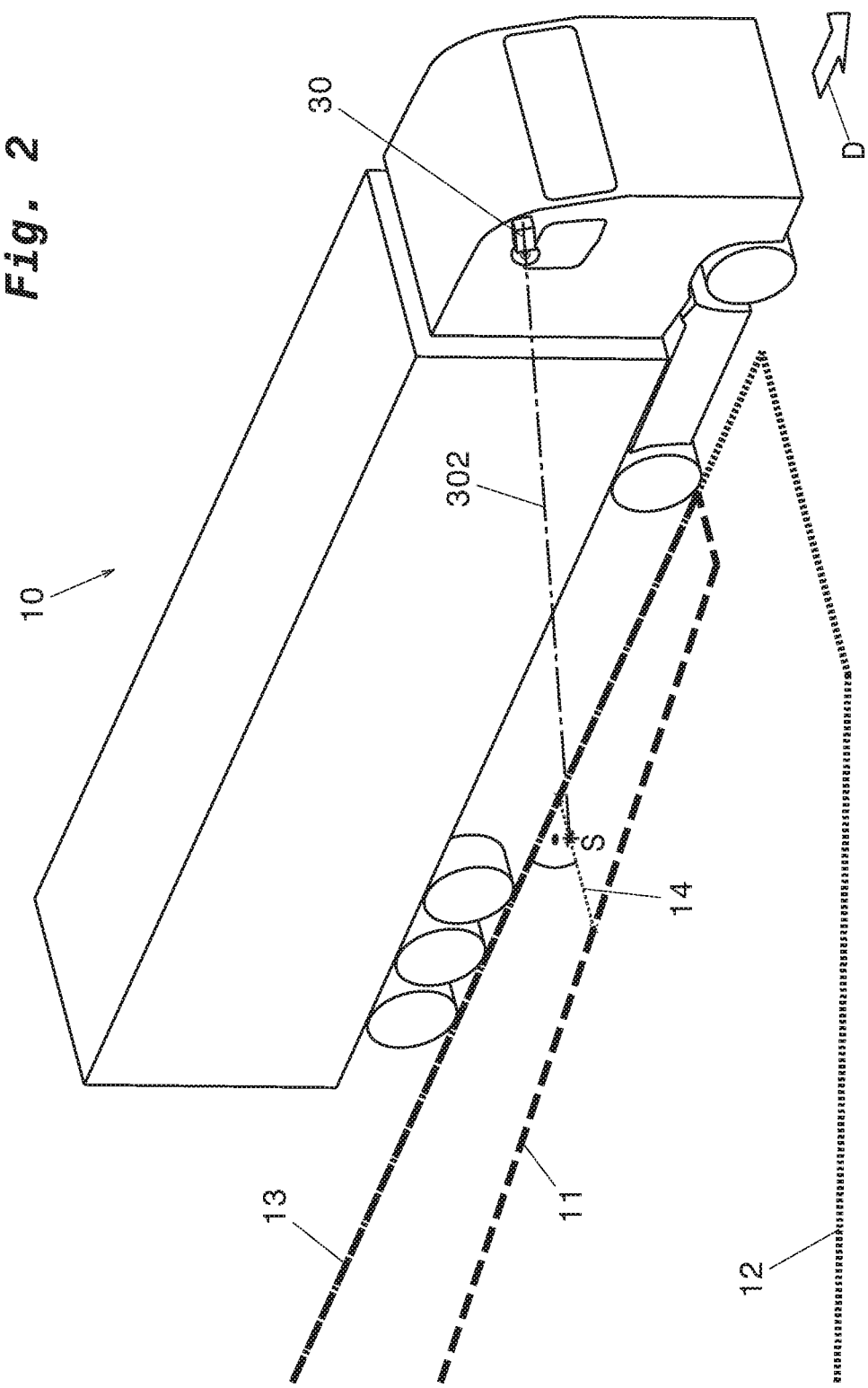
FIG. 2 is a perspective view of a commercial vehicle with a camera system according to the invention.

FIG. 2 shows a perspective view of a commercial vehicle 10 that is provided with a mirror replacement system 100 according to FIG. 1. Accordingly, one or more capturing units 30 are mounted to the commercial vehicle 10. As illustrated in FIG. 2, the exemplary mirror replacement system 100, which is mounted on the vehicle, is adapted for capturing a field of vision 11 of a main mirror and a field of vision 12 of a wide angle mirror by means of the capturing unit 30, and to display the same in/at the driver's cabin of the vehicle 10 visible for the driver of the commercial vehicle 10. In FIG. 2, the field of vision 11 of a main mirror and the field of vision 12 of a wide angle mirror are schematically illustrated by dashed lines (field of vision 11 of a main mirror by long dashes, field of vision 12 of a wide angle mirror by shorter dashes) on the plane road surface beside the vehicle 10.

Further, in FIG. 2, the forward driving direction is denoted by an arrow D. All directions specified in this description, i.e. front, rear, left, right etc. refer to the forward driving direction D of the vehicle.

The field of vision 1 of the main mirror, which is shown in FIG. 2, extends from a lateral boundary line 13 of the vehicle in lateral direction away from the vehicle and to the rear. The lateral boundary line 13 is a line defined by the intersection of the plane horizontal road with a plane in parallel to the central longitudinal line (not illustrated) of the vehicle, and passing through the, in lateral direction, outmost point of the vehicle.

The optical axis 302 of the optical element 301 (FIGS. 3, 4) of the capturing unit 30, which is, for example, provided by a camera, extends in lateral direction at an angle with respect to the central longitudinal plane of the vehicle and the road surface, such that it intersects the field of vision 11 of a main mirror on the road surface. This means that the intersection point S or crossing point of the optical axis 302 and the road surface is within the field of vision 11 of a main mirror in the embodiment shown in FIG. 2. Preferably, the intersection point S is located maximally 6 m behind the capturing unit 30 when viewed in the longitudinal direction of the vehicle, more preferably in the range of 4 to 5 m.

Moreover, a straight line-of-sight segment 14 is illustrated in FIG. 2 by thin dotted lines, which straight line-of-sight segment is defined by the line segment of a line perpendicular to the lateral boundary line 13 and passing through the intersection point S of the optical axis 302 and the road surface, which is located within the area of the field of vision 11 of the main mirror.

In the following, the capturing unit 31 of the camera system 130 is described in further detail with reference to FIGS. 3 and 4, which schematically show the beam path through a schematically illustrated optical element in a sectional view and perspective view (cut), respectively, as well as by means of FIGS. 5 and 6, which schematically show embodiments of a structure of the optical element.

The optical element 301 and the image sensor 302 form the essential components of the capturing unit 30 for the camera system for a motor vehicle. As can be seen in FIGS. 3 and 4, in the present embodiment, the optical element 301 is substantially rotationally symmetric around the optical axis 302. This means that any light beam incident on the capturing unit 30 from an object point to be displayed at an identical angle, e.g. $\alpha_1$, with regard to the optical axis 302, is displayed on the image sensor surface 304 rotationally symmetric around the optical axis with identical distortion. The angle a, in the following also referred to as object angle $\alpha$, corresponds to an angle that is the incidence angle of the light beam into an optical element 301, having an incidence surface (virtually not illustrated) perpendicular to the optical axis 302. Accordingly, any light beam incident at the object angle $\alpha_1$ is displayed on the image sensor surface 304 with a distance $r_1$ to the optical axis 302. Here, the image sensor surface 304 is the surface that is actually provided for display within the entire image aperture/opening angle of the optical element 301, i.e. the surface of the image sensor 302, which is suitable for display, and which faces the optical element 301.

Figure 3:
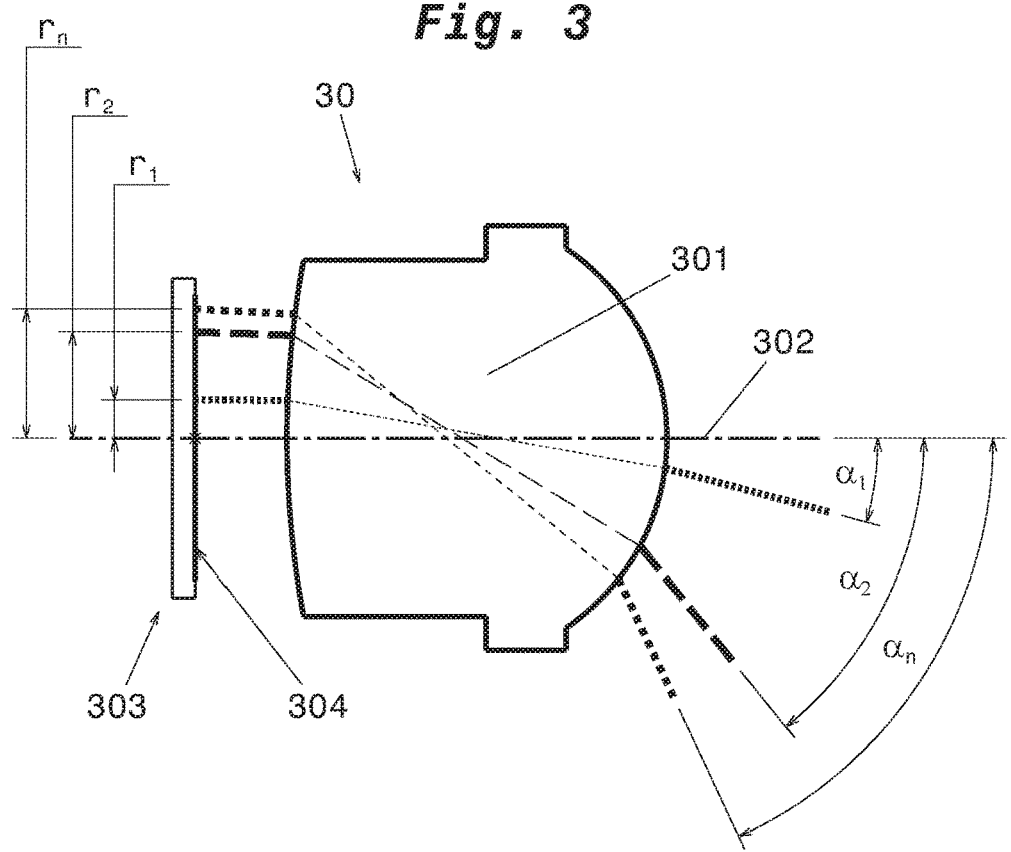
FIG. 3 is a simplified sectional view of the essential components of the camera system.
Figure 4:
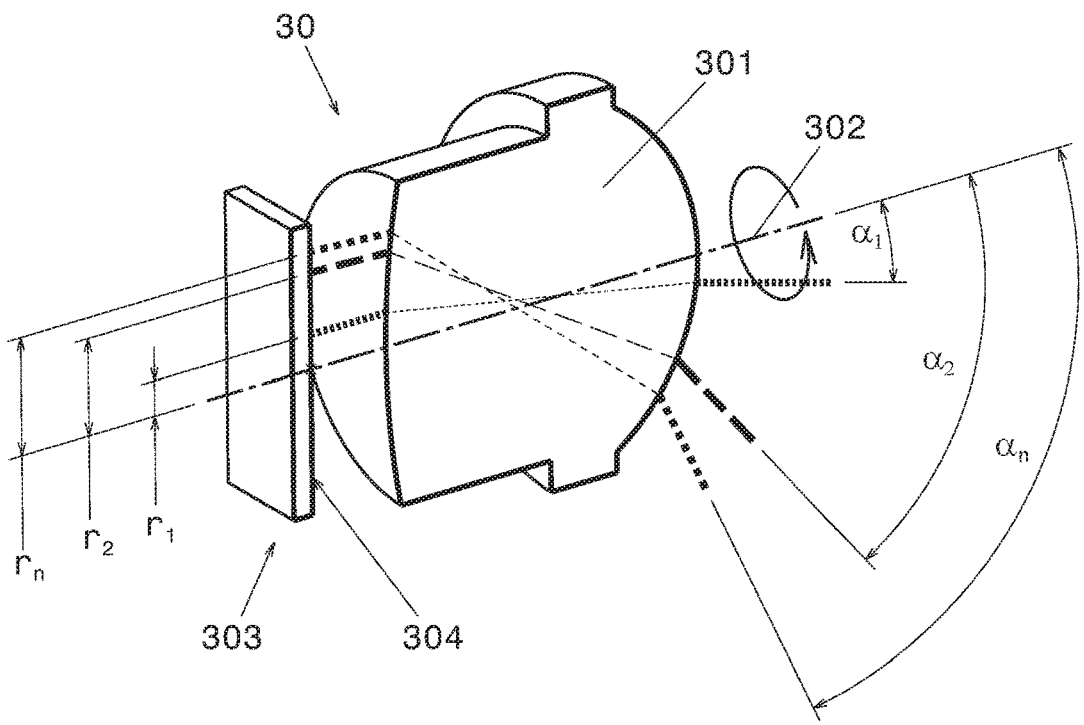
FIG. 4 is a perspective view of the essential components of the camera system, in accordance with FIG. 3.

FIGS. 3 and 4 schematically illustrate the beam paths through the optical element 301 and their respective display on the image sensor surface 304 of the image sensor 303 at distances $r_1, r_2, \ldots, r_n$ for different object angles $\alpha_1, \alpha_2, \ldots \alpha_n$. As, in the illustrated embodiment, the optical element 301 is rotationally symmetric, the distance $r_1, r_2, \ldots, r_n$ and the beam path through the optical element 301 are also rotationally symmetric with regard to the optical axis 302. The optical axis 302 for which $\alpha=\alpha_0=0°$, $r=r_0=0$ strikes the image sensor surface 304 at the origin of a distortion curve ($\alpha=0$; $r=0$) of an $\alpha$, r coordinate system.

The optical element 301, which, as schematically illustrated in FIGS. 5 and 6, is composed of a lens system and, if necessary, further optical components, and comprises a plurality of rotationally symmetric lenses that are arranged in a row one behind the other, has a so-called distortion curve $r=f(\alpha)$, which is a geometrical imaging error of the optical element, causing a local change of the image scale. Due to the rotational symmetry of the optical element 301, the distortion curve $r=f(\alpha)$ of the embodiment shown in FIGS. 3 and 4 is also rotationally symmetric with regard to the optical axis 302.

An embodiment of the lens arrangement is illustrated in FIG. 5. Here, the seven lenses 314 to 320 are arranged in a row in the path of the incident light (from left to right in FIG. 5). Lens 314 is a spherical convex-concave lens, lens 315 is a spherical convex-concave lens. Lens 316 is formed by a spherical concave-convex lens, lens 317 by a freeform lens (aspherical lens) having a convex-concave surface and a concave surface, lens 318 is a spherical bi-convex lens, lens 319 is an aspherical lens having a convex surface and a convex-concave surface, and lens 320 is an aspherical lens having a concave and a convex-concave surface. The freeform surfaces of lenses 317 and 320 are also rotationally symmetric, such that the optical element 301 of the embodiment of FIG. 5, which is formed by the seven lenses, is rotationally symmetric with regard to the optical axis 302. In the embodiment of FIG. 6, a sensor protection glass 305 and an infrared filter 329 may be provided in front of the image sensor 303 (see embodiment of FIG. 6). Also in this case, the optical element 301 has the schematically indicated beam path, as well as a distortion curve $r=f(\alpha)$ having a turning point in the region $0<r<r_{max}$.

In the alternative embodiment of the optical element 301 shown in FIG. 6, the optical element 301 comprises eight lenses 306, 307, 308, 309, 310, 311, 312, 313 arranged in a row along the beam path of the incident light (from the left to the right in FIG. 6). In the order, in which the incident light passes the lenses on its way to the image sensor 303, lens 306 is a spherical convex-concave lens, lens 307 is a spherical convex-concave lens, lens 308 is a spherical concave-convex lens, lenses 309 and 310 are, respectively, spherical bi-concave lenses, lens 311 is a spherical bi-concave lens, lens 312 is a freeform lens (aspherical lens) having a rotationally symmetric convex-concave surface and a convex surface, and lens 313 is an aspherical concave-spherical convex lens. Moreover, a sensor protection glass 305, as well as an infrared filter 329 are provided as additional optical components in front of the image sensor 303. By means of such lens arrangement, the incident light, as exemplarily shown for some beams in FIG. 6, is guided through and diverted by the optical element 301. Therefore, and due to the respective lens arrangement, the optical element 301 as a whole has the distortion curve r=f(α), which has a turning point in the region of the image sensor surface 304 $0 < r < r_{max}$.

Both the optical system shown in FIG. 5 and the optical system shown in FIG. 6 comprises an aperture 303 as a further component. Additional filters, apertures etc. may be provided if necessary. The lenses may be formed, for example, of glass (especially spherical lenses) or of synthetic material. Different materials can be combined where required. Moreover, the lenses may be provided with, for example, a vapour-deposited metallic coating or a different coating, which usually has no influence on light refraction, but only serve to influence scattering, eliminate undesired reflexion etc.

Most of the lenses 307 to 320 of the embodiments shown in FIGS. 5 and 6 are lenses having at least a partially spherical surface. E.g. lenses 312, 317 and 320, however, are so-called aspherical lenses, which have at least one surface that is not partially spherical. Although not illustrated in FIGS. 5 and 6, by selecting suitable lenses that are not rotationally symmetric with regard to the optical axis 302, it is also possible to form the optical element 301 anamorphic, so that the optical element has a distortion curve that is not rotationally symmetric with regard to the optical axis.

Figure 7:
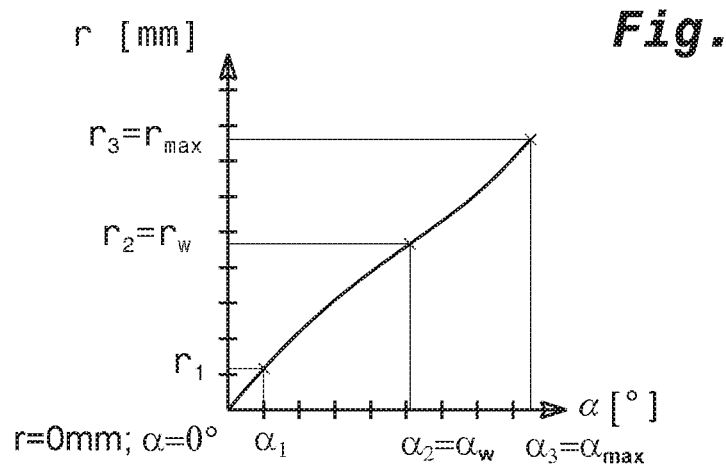
FIG. 7 shows the distortion curve of the optical element of the capturing unit in an a, r coordinate system.
Figure 8:
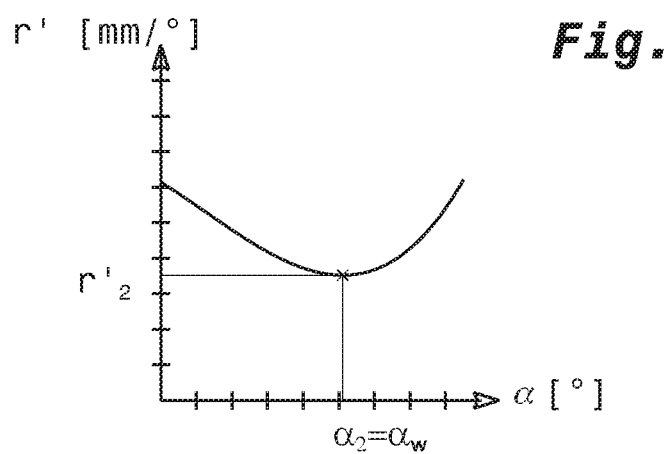
FIG. 8 shows the first derivative of the distortion curve of the optical element of the capturing unit of the capturing system.
Figure 9:
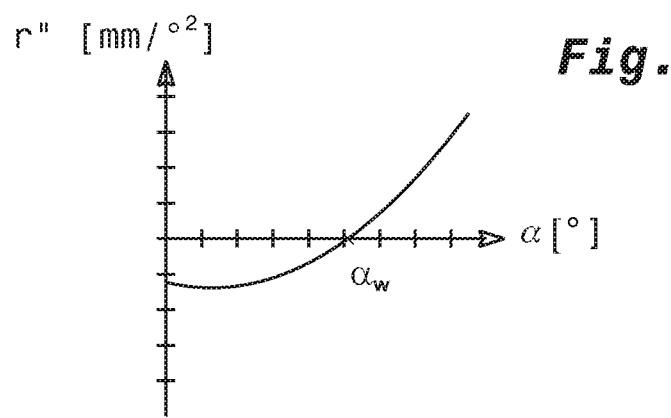
FIG. 9 shows the second derivative of the distortion curve of the optical element of the capturing unit of the camera system.

By means of the exemplary lens arrangements shown in FIGS. 5 and 6, rotationally symmetric distortion curves r=f(α) of the optical element can be generated, which are a function r=f(α) having a turning point $(α_w; r_w)$ within the maximal distance $r_{max}$, which is the maximal distance of a point on the image sensor surface 304 with regard to the optical axis 302 on the image sensor surface 304. To attain the turning point in the region of $0 < r(α) < r_{max}$ for the distortion curve r=f(α), for aw corresponding to a radius $r_w$ on the image sensor surface 304, which is smaller than $r_{max}$, the following has to apply: $r''=f''(α_w)=d^2r/dα^2 \ (α=α_w)=0$; $r''=f''(α)<0$ for $0<α<α_w$; $r''=f''(α)>0$ for $α_w<α<α_{max}$. Such type of distortion curve, which may, for example, be achieved by the lens arrangement of the optical element according to FIGS. 5 and 6, is schematically shown in FIG. 7. Its first derivative is shown in FIG. 8 and its second derivative is shown in FIG. 9.

As shown in FIG. 7, in an α,r coordinate system, a turning point $(d_w; r_w)$ is present in the region $[0; r_{max}]$. Further, at a specific object angle $α=α_2=α_w$, the second derivative (FIG. 9) of the distortion curve is zero, i.e. has a zero crossing at $α_w$. As illustrated in FIG. 9, in front of the turning point, i.e. in the region of $0°<α<α_w$, the second derivative of the distortion curve r=f(α) is negative; for the region $α_w<α<α_{max}$, the distortion curve is positive. This means that, as can be seen in FIG. 7, the distortion curve r(α) is curved to the right in a first region of $0°<α<α_w$, and curved to the left in a second region of $α_w<α<α_{max}$.

The origin of the α,r coordinate system in FIG. 7, i.e. r=0 mm, α=0°, corresponds to the point of the optical axis 302 on the image sensor. $r_{max}$ is the maximal distance a point on the image sensor can have from the optical axis 302. If, in a rectangular image sensor, the optical axis is centric, i.e. arranged at the centroid, and the rectangular image sensor has edge lengths a, b, $r_{max}=\sqrt{a^2+b^2}$ applies. If the optical axis is not arranged centrically on the image sensor, the distance $r_{max}$ is the distance between the optical axis 302 on the image sensor surface 304 to the most distant corner of the image sensor surface 304.

Figure 10A:
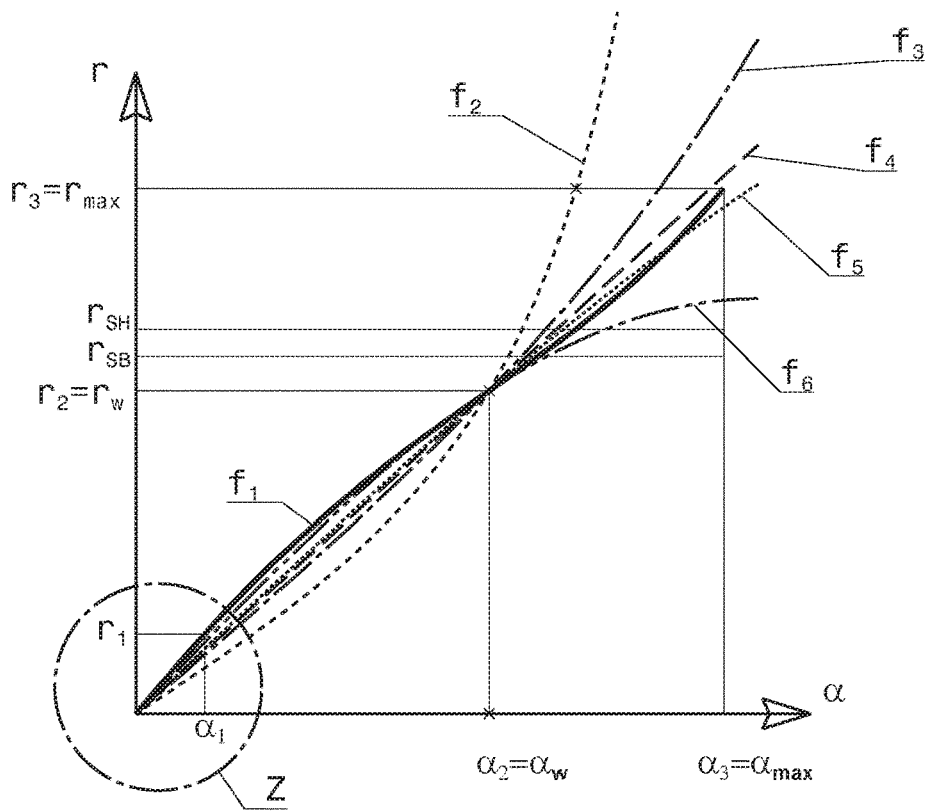
FIG. 10a shows the distortion curve of the optical element of the capturing unit of the camera system in comparison to conventional distortion curves.
Figure 10B:
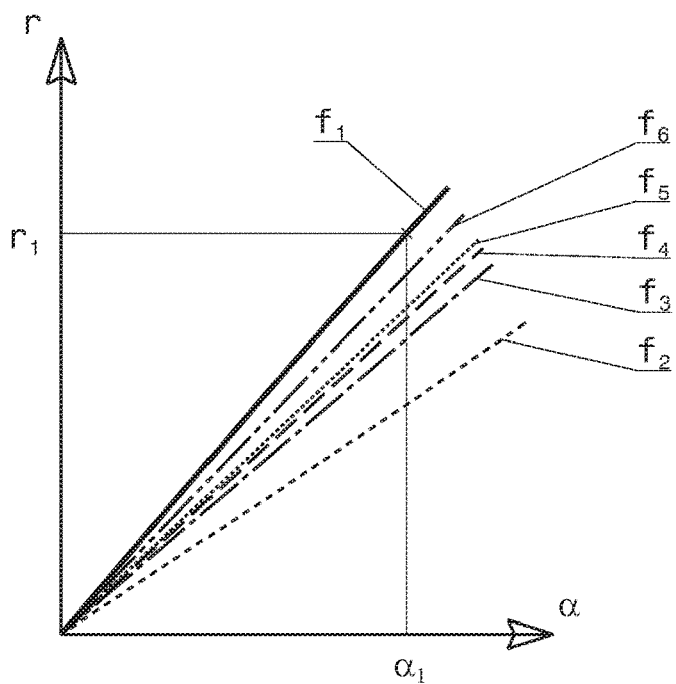
FIG. 10b is a detail of FIG. 10a showing the distortion curves around the origin of the distortion curve.

FIGS. 10a and 10b show, also in the α,r coordinate system, the distortion curve r=f(α) for an optical element 301 of the capturing unit 30 in comparison to several distortion curves of the prior art. FIG. 10b shows an enlarged section Z in the region of the origin of the α,r coordinate system. The distortion curve r=f(α) having a turning point $(α_w; r_w)$ in the region of $0<α<α_{max}$, is illustrated by a solid line and denoted by $f_1$. $f_2$ denotes a gnomonic distortion curve (distortion-free), $f_3$ a stereographic distortion curve, i.e. a conformal distortion curve, $f_4$ an equidistant distortion curve, $f_5$ an equal-area distortion curve, and $f_6$ an orthographic distortion curve. The focal lengths with regard to the distortion curves are selected such that all distortion curves pass through the point $(α_w, r_w)$.

As can be seen from FIG. 10a and FIG. 10b, distortion curve $f_1$ has a turning point at $(α_w; r_w)$, where the curvature of the distortion curve changes from curved to the right (in the region $0<α<α_w$) to curved to the left (in the region of $α_w<α<α_{max}$). Further, as can be seen in particular from FIG. 10b, the gradient of the distortion curve $f_1$ in the range near the origin of the α,r coordinate system is large, in particular compared to the other distortion curves. This means that a relatively large space for displaying a relatively small angle is provided on the image sensor 303, which has the effect that the area in this region can be displayed with high resolution. Moreover, the gradient of the distortion curve $r=f_1(α)$ at the turning point $(α_w; r_w)$ is minimal, i.e. at the turning point itself and in its close proximity, a relatively low gradient is present. Finally, for $α_{max}$, the gradient of the distortion curve is preferably maximal or relatively large, as can be particularly seen from the illustration in FIG. 10a.

A distortion curve as illustrated in FIGS. 7 to 10b, is, for example, described by a polynomial function $f(α)=\sum_{i=0}^{n} α_i α^i$. Alternatively, a spline function may describe the distortion curve, said spline function being a partial polynomial function, i.e. a function consisting of a plurality of polynome pieces/units, or a Bézier curve, which is a mathematically formulated curve (numerically generated curve).

Figure 11:
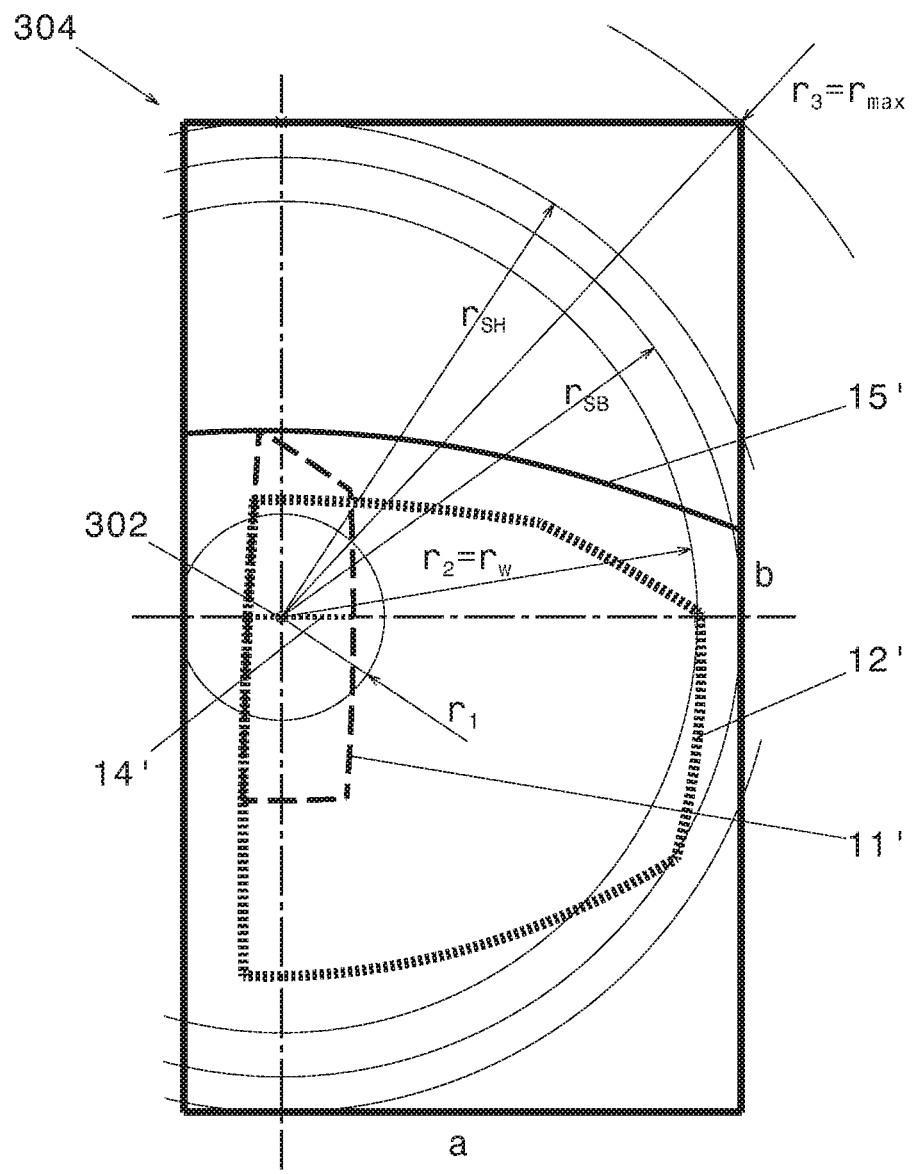
FIG. 11 is a schematic view of the image sensor of the capturing unit, where fields of vision of a main mirror and a wide angle mirror according to FIG. 2 are illustrated.
Figure 12:
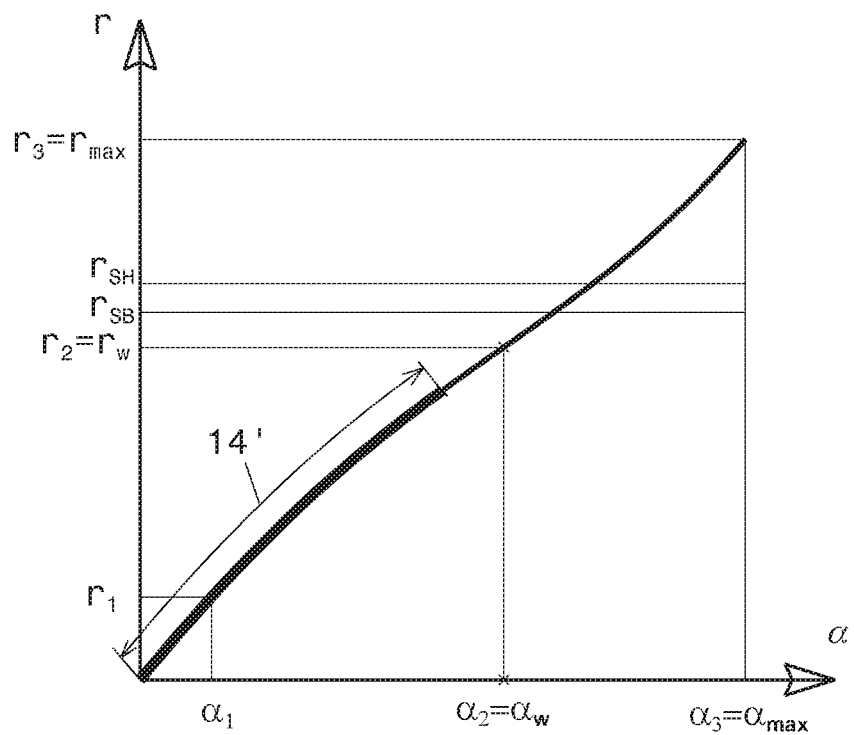
FIG. 12 shows details of the distortion curve of the capturing unit of the camera system of the embodiment shown in FIG. 11.

Referring to FIG. 11 and FIG. 12, a display of the field of visions 11, 12 for the commercial vehicle 10 (FIG. 2), which are captured by means of the camera system 130, on the image sensor surface 304 is explained. The image sensor surface 304 of the image sensor 303 shown in FIG. 11 is rectangular with side lengths a and b of the rectangle. As can be seen in FIG. 11, in the illustrated embodiment, the optical axis 302 is arranged eccentrically with regard to the image sensor surface 304, i.e. beyond the centroid of the image sensor surface 304. Specifically, the optical axis 302 is eccentric with regard to side a of the rectangular image sensor surface 304. This results in a maximal distance $r_3=r_{max}$ from the optical axis 302 on the image sensor surface 304 to the most distant corners of the image sensor surface 304. Moreover, in accordance with FIGS. 10a and 10b, those radii having the optical axis 302 as a center are illustrated, which pass through the turning point of distortion curve r=f(α) $(r_2=r_w)$, a radius $r_{SB}$ corresponding to the maximal distance from the optical axis 302 to the edge of the sensor surface in parallel to the side line a; a radius $r_{SH}$ corresponding to the maximal distance from the optical axis 302 on the sensor surface 304 to the edge of the sensor surface in parallel to the sensor edge b; as well as a radius $r_1$, which corresponds to an illustrated first radius $r_1$ at an angle $\alpha_1$ as illustrated in FIGS. 10a and 10b. Further, in FIG. 11, the displayed image 11' of the field of vision 11 of the main mirror (see FIG. 2), as well as the displayed image 12' of the field of vision 12 of the wide angle mirror (see FIG. 2), as well as a displayed image 15' of the horizon line, are illustrated. As can be seen, specifically the displayed image 11' of the field of vision 11 of the main mirror is largely within a region located within the radius $r_1$, such that this region within radius $r_1$ is displayed with increased resolution compared to normal distortion curves of the prior art. Moreover, the entire displayed image 12' of the field of vision 12 of the wide angle mirror can be effected on the same image sensor with the same optical element. It is not necessary to provide a second optical element and/or a second image sensor and to subsequently combine the image for display.

Furthermore, in FIG. 11, the displayed image 14' of the straight line-of-sight segment 14 (see FIG. 2) is illustrated. As can be seen from FIG. 11, this line segment substantially extends in parallel to a lateral edge of the image sensor surface 304 (lateral edge a).

In FIG. 12 this displayed image 14' of the straight line-of-sight segment is also represented in the $\alpha$,r coordinate system, in addition to the displayed image of the distortion curve $r=f_1(\alpha)$. It is clearly recognizable that the entire width of the displayed image of field of vision 11 of the main mirror is within the region of $0<\alpha<\alpha_w$, which is in the region of the distortion curve $r=f(\alpha)$ that is curved to the right and, thus, involves high resolution (specifically when compared to the distortion curves of conventional optical systems).

In the presently described embodiment, where the camera system 130 is used in a mirror replacement system 100 of a vehicle, a processing unit 120 of the mirror replacement system 100 can subsequently evaluate the image data captured by the image sensor 303, and display the same, for example on a monitor, visible for a driver located, for example, in the driver's cabin of a commercial vehicle. In the present embodiment, separate regions are read out for the field of vision 11 of a main mirror and the field of vision 12 of a wide angle mirror and, in a preferred embodiment (not illustrated), displayed to the driver in separate regions of the display unit 110. The separate regions may be provided on a common monitor or on separate monitors. It is therefore possible to model the usual appearance of a main mirror and a wide angle mirror for the driver of the commercial vehicle. If the camera system 130 is, for example, used in the context of a driver assistance system, the regions of interest of the image sensor surface 304 can be also evaluated with regard to specific environmental information (e.g. road lines, traffic signs, other road users etc.) by a processing unit and, dependent on the captured and determined information, it can be interfered in the drive control system, a note or information may be indicated to the driver, etc.

In a mirror replacement system 100 as described above, it is further possible, dependent on the driving situation of the vehicle, for example, a commercial vehicle 10, to extract data to be displayed to the driver on the display unit 100 from different regions of the image sensor surface 304, i.e. to evaluate different portions of the image senor surface 304 at different times during driving operation. This is exemplarily described with reference to FIGS. 13 and 14.

Figure 13:
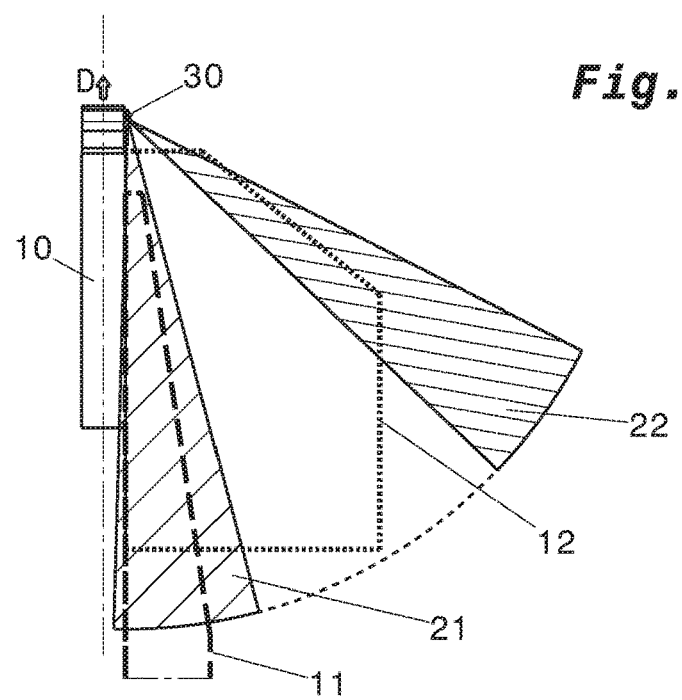
FIG. 13 is a schematic top view of a commercial vehicle, which schematically shows the movement of a region to be illustrated depending on the driving situations of the vehicle.
Figure 14:
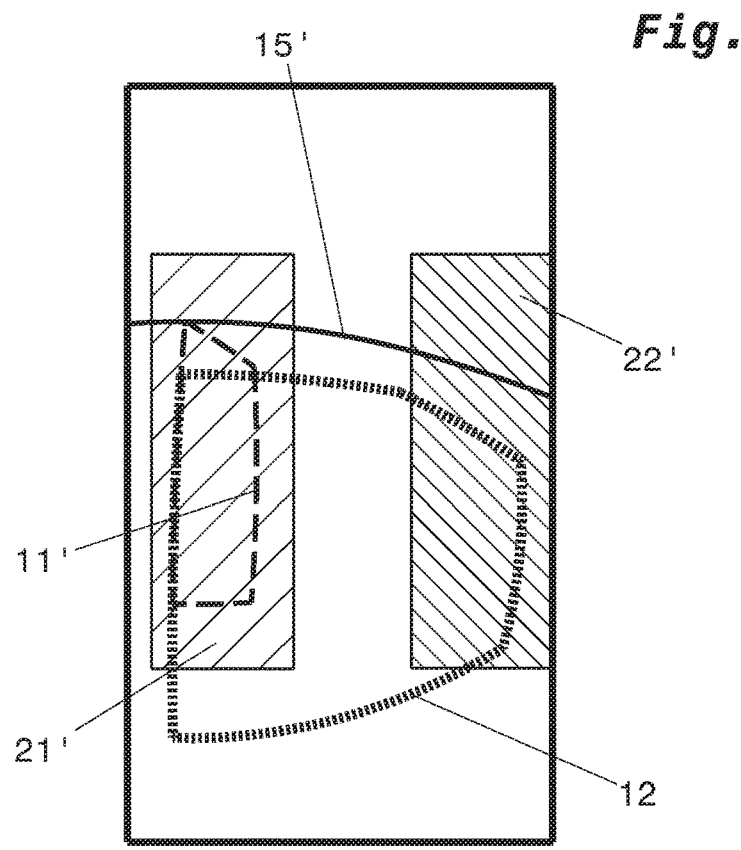
FIG. 14 is a schematic view of an image sensor surface of the capturing unit of the camera system, which illustrates the shift/displacement of the regions of interest according to FIG. 13 on the image sensor surface.

FIG. 13 shows a top view of a commercial vehicle during forward or straight ahead driving, wherein the field of vision 11 of a main mirror and the field of vision 12 of a wide angle mirror are schematically illustrated. FIG. 14 illustrates, also for straight ahead driving, the image sensor surface 304 with the displayed image 11' of the field of vision 11 and the displayed image 12' of the field of vision 12. As already explained above, during normal straight ahead driving, the region 21' for illustrating/displaying the field of vision 11 of the main mirror and for providing the driver with a view of the field of vision 11 of the main mirror, respectively, is extracted from the data in a specific first portion on the image sensor surface 304. If the driving situation changes, it may happen that, while the alignment of the capturing unit 30 on the vehicle does not change, the region of interest shifts from the original region of interest 21 to the displaced/shifted region 22. This may be the case if a vehicle, in particular a commercial vehicle with trailer, drives along curves or performs a manoeuvring process. In this case, the region of interest, which corresponds to the field of vision 11 of the main mirror, as illustrated in FIG. 13, shifts to the region 22. By means of the camera system 130 comprising the capturing unit 30 that includes the optical element 301, which has the distortion curve $r=f(\alpha)$ of the above-described type, it is possible to also shift the region on the image sensor surface 304, from which region image sensor data are extracted, such that, as illustrated in FIG. 14, image data of a region 22' on the image sensor surface 304 are extracted. This is possible without losing the required precision of the image data, i.e. in particular the resolution, as the distortion curve $r=f(\alpha)$ can provide the required resolution and distortion in all regions from which data may be extracted, without requiring data post-processing. Thus, the field of vision 11 and its displayed image 11', respectively, may be updated corresponding to the driving situation. A mechanical adjustment of the capturing unit 30 is not required. Rather, adjusting may be effected exclusively by data extraction of the image data of the image sensor 304 in selected regions.

These advantages are achieved by using at least one capturing unit 30 comprising an optical element 301 having a distortion curve $r=f(\alpha)$, which has a turning point within the maximal distance of a point on the image sensor surface 304 to the optical axis 302 on the image sensor surface 304.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A mirror replacement system, wherein the mirror replacement system is part of a commercial vehicle, and comprising a camera system for a vehicle, wherein the camera system comprises a capturing unit including an optical element and an image sensor having an image sensor surface and adapted to capture a section of a vehicle environment,
wherein
the optical element has a distortion with a distortion curve $r=f(\alpha)$, wherein r is the distance from an object point depicted on the image sensor surface to the intersection point of the optical axis with the image sensor surface, and a is the angle between the optical axis of the optical element and the beam incident in the optical element from the object point,
the distortion curve $r=f(\alpha)$ for $r_w=f(\alpha_w)$ has a turning point $(\alpha_w; r_w)$ within $0<r<r_{max}$, for which $r''=f''(\alpha_w)=d^2r/d\alpha^2(\alpha_w)=0$ applies, wherein $r_{max}$ is the distance $r=f(\alpha_{max})$ on the image sensor surface from the optical axis to the most distant boundary point of the image sensor surface, and
for the curvature of the distortion curve
$r''=f''(\alpha)<0$ for $0°<\alpha<\alpha_w$
$r''=f''(\alpha)>0$ for $\alpha_w<\alpha<\alpha_{max}$
applies, and
further comprising a processing unit for processing the data of the capturing unit and/or a display unit for displaying information captured by the capturing unit visible for the vehicle driver,
wherein:
the capturing unit is adapted to capture at least one of the field of vision of a main mirror, or the field of vision of a wide angle mirror on a side of the commercial vehicle, or the field of vision of a (close-)proximity mirror, or the field of a front mirror, the capturing unit is prefer-ably adapted to capture both the field of vision of a main mirror and the field of vision of a wide angle mirror on the same side of the commercial vehicle,
the optical axis of the optical element of the capturing unit intersects the field of vision or one of the fields of vision,
the optical axis of the optical element crosses one of the fields of vision in an intersection point (S) at a maximal distance of 5 m to a lateral boundary line of the vehicle, where-in the lateral boundary line is an intersecting line of a plane in parallel to the central longitudinal plane of the vehicle, which plane passes through a lateral outermost point of the vehicle, with the horizontal plane road.

2. The mirror replacement system according to claim 1, wherein distortion curve $r=f(\alpha)$ has exactly one turning point $(\alpha_w; r_w)$ within $0<r<r_{max}$.

3. The mirror replacement camera system according to claim 1, wherein the gradient $r'=dr/d\alpha$ of distortion curve $r=f(\alpha)$ is maximal in the region $0°<\alpha<\alpha_w$ at the zero point $r=f(0)=0$ of the distortion curve.

4. The mirror replacement system according to claim 1, wherein the gradient $r'=dr/d\alpha$ of distortion curve $r=f(\alpha)$ is minimal at the turning point $r=f(\alpha_w)=r_w$ of the distortion curve.

5. The mirror replacement system according to claim 1, wherein the gradient $r'=dr/d\alpha$ of distortion curve $r=f(\alpha)$ is maximal in the region $\alpha_w<\alpha<\alpha_{max}$ for $\alpha_{max}$ ($r=f(\alpha_{max})=r_{max}$) of the distortion curve.

6. The mirror replacement system according to one of the preceding claims, wherein distortion curve $r=f(\alpha)$ is a polynomal function $f(\alpha)=\Sigma_{i=0}^{n}\alpha_i\alpha^i$.

7. The mirror replacement system according to claim 1, wherein the distortion curve $r=f(\alpha)$ is a spline function.

8. The mirror replacement system according to claim 1, wherein the distortion curve $r=f(\alpha)$ is a Bezier curve.

9. The mirror replacement system according to claim 1, wherein the centroid of the image sensor area and the intersection point of the optical axis with the image sensor surface do not coincide, and the optical axis is disposed eccentrically with respect to the image sensor surface.

10. The mirror replacement system according to claim 1, wherein the optical element includes at least one lens having a shape other than a partial sphere.

11. The mirror replacement system according to claim 1, wherein the optical element includes at least one aspherical lens.

12. The mirror replacement system according to claim 1, wherein the optical element includes at least two lenses that are different from each other.

13. The mirror replacement system according to claim 1, wherein the optical element has a rotationally symmetric distortion with regard to its optical axis, so that the distortion curves $r=f(\alpha)$ are identical for each angle of rotation $\beta$ around the optical axis.

14. The mirror replacement system according to claim 1, wherein the optical element has a distortion that is not rotationally symmetric with regard to its optical axis, so that a first distortion curve $r_1=f(\alpha)$ for a rotational angle $\beta_1$ about the optical axis differs from a second distortion curve $r_2=f(\alpha)$ for a rotational angle $\beta_2$ about the optical axis.

15. The mirror replacement system according to claim 14, wherein the optical element is anamorphic.

16. The mirror replacement system according to claim 1, wherein the mirror replacement system is adapted to display at least two fields of vision around the vehicle visible for the driver, wherein preferably a first field of vision is visible in a first region of the display unit, and a second field of vision is visible in a second region of the display unit, which second region is optically separated from the first region.

17. The mirror replacement system according to claim 16, wherein the mirror replacement system is adapted to capture the information of the two fields of vision by means of a joint/common capturing unit of the camera system, and the processing unit is adapted to separate and extract the data received from the capturing unit into information to be displayed in the first region of the display unit and the second region of the display unit, respectively.

18. The mirror replacement system according to claim 1, wherein a straight line-of-sight segment perpendicular to the lateral boundary line, which line segment passes through the intersection point (S) and is limited by the limitation of the field of vision of the main mirror, is in the region of the distortion curve $r=f(\alpha)$ for $0°<\alpha<\alpha_w$ with $r''=f''(\alpha)<0$.

19. The mirror replacement system according to claim 18, wherein the turning point $(\alpha_w; r_w)$ is beyond the straight line-of-sight segment.

20. A driver assistance system comprising the mirror replacement system according to claim 1.

21. The mirror replacement system according to claim 1, wherein the mirror replacement system is adapted to visually display the information captured by the capturing unit, and is further adapted to display at least a field of vision, which is located on a plane horizontal part of the road around the vehicle, on the display unit visible for the vehicle driver.

* * * * *